June 2, 1970  HIROSHI IMADATE  3,515,884
DETECTING AND COUNTING APPARATUS FOR PARTICLES
SUSPENDED IN A LIQUID
Filed April 26, 1968

INVENTOR.
HIROSHI IMADATE
BY
ATTORNEY

United States Patent Office 3,515,884
Patented June 2, 1970

3,515,884
DETECTING AND COUNTING APPARATUS FOR PARTICLES SUSPENDED IN A LIQUID
Hiroshi Imadate, Kobe, Japan, assignor to Toa Electric Company Limited, Kobe, Japan, a company of Japan
Filed Apr. 26, 1968, Ser. No. 724,569
Claims priority, application Japan, May 17, 1967, 42/41,200
Int. Cl. G01n *21/26*
U.S. Cl. 250—218               10 Claims

ABSTRACT OF THE DISCLOSURE

An improved device for the detecting and measurement of particles suspended in a liquid which includes a narrow channel or orifice having detecting means for detection of the particles passing therethrough, a chamber communicating with said detecting orifice and a perforated member having a multiplicity of openings not greater than the size of the opening in said orifice through which the liquid containing the particles is fed to said chamber and orifice, the openings in the perforated member breaking up particle clusters and producing turbulence and agitation in the chamber so that the particles will pass individually through the orifice.

---

Figure 1:
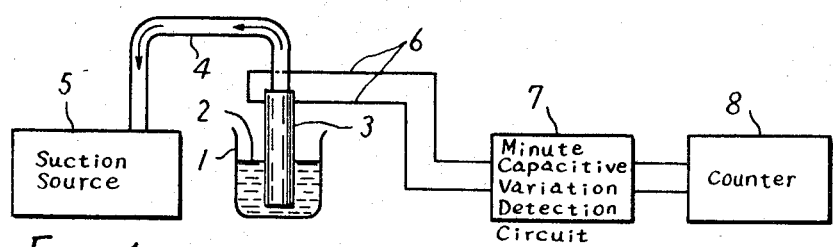

This invention relates to apparatus for detecting particles suspended in a flowing medium and more specifically to a novel and improved device affording an exceedingly accurate particle count by reason of a novel and improved arrangement of elements which affords a substantially uniform distribution of particles in the liquid medium so that the particles will pass individually through a fine measuring orifice.

Apparatus in accordance with this invention is particularly useful for counting blood cells as it provides means for separation and distribution of the cells uniformly in the flowing medium for counting purposes. Present procedures for counting blood cells involves the dilution of the blood in a suitable liquid which aids in separation of the blood cells in order to facilitate counting. With known systems, however, it has been found that even with the dilution of the blood the very narrow orifice or opening through which the cells must pass often becomes clogged because of the tendency of the cells to become grouped or because of the presence of blood coagulation, dust, or other foreign substances. If the measuring orifice is made large enough to avoid clogging, it has been found that two or more blood cells may pass through the orifice simultaneously resulting in material errors in determining the actual blood count. Present blood counting systems compensate for the clogging problem by providing a measuring orifice with an inside diameter of about 50 to 100 microns or of the order of three to ten times the diameter of the blood cells or corpuscles. Even under such conditions, it has been found that the measuring orifice will become clogged, and it is of course necessary to modify statistically the actual count in order to compensate for errors occasioned by the passage of two or more blood cells simultaneously through the measuring opening.

One object of the invention is to overcome the difficulties heretofore encountered and provide a measuring device having a relatively small orifice for the detection of the particles, and at the same time providing a structure that will afford substantially uniform distribution of the cells within the liquid so that they will pass individually through the measuring orifice. This is attained through the utilization of a very fine filter or mesh having a multiplicity of openings larger than the particles being measured but not exceeding the diameter of the measuring orifice. By applying adequate pressure to cause the fluid to move through the filter, the filter will effectively break up particle clusters and the turbulence resulting from the action of the filter will effect a substantially uniform distribution of particles throughout the liquid. In this way the particles will pass singly through the measuring orifice so that clogging is effectively avoided. Even though some of the openings in the filter or mesh may become clogged such clogging will not interfere with the measuring procedure.

Still another object of the invention resides in the provision of a novel and improved particle counter wherein two or more particles suspended in a fluid will not pass simultaneously through the detecting means. This is attained through the utilization of a finely perforated filter wherein the openings in the filter are related to a measuring opening through which the particles are passed so that the particles will be separated one from the other and will move individually through the opening.

A still further object of the invention resides in the provision of an improved device to enable the detection and counting of particles suspended in a liquid wherein a multiplicity of means are provided for breaking up particle clusters, and at the same time producing turbulence and agitation of the liquid to provide a substantially uniform distribution of particles immediately prior to the passage of the liquid and the particles through a measuring orifice.

Still another object of the invention resides in the provision of a novel and improved device for counting particles suspended in a flowing medium wherein the detecting orifice and the cooperating elements for effecting uniform dispersion of the particles prior to passage through the orifice are arranged within a housing in such a manner that the critical and delicate portions thereof are protected during normal handling operations.

The above and other objects of the invention will become more apparent from the following description and accompanying drawings forming part of this application.

Figure 4:
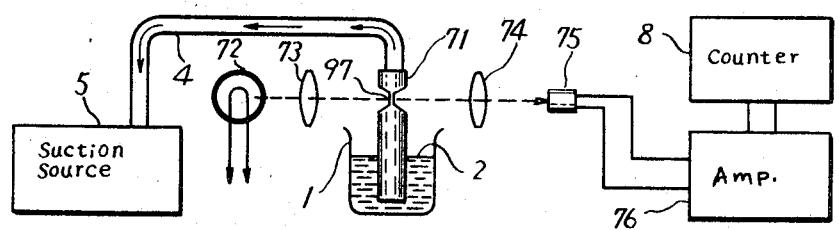
Figures 2, 3, 5:
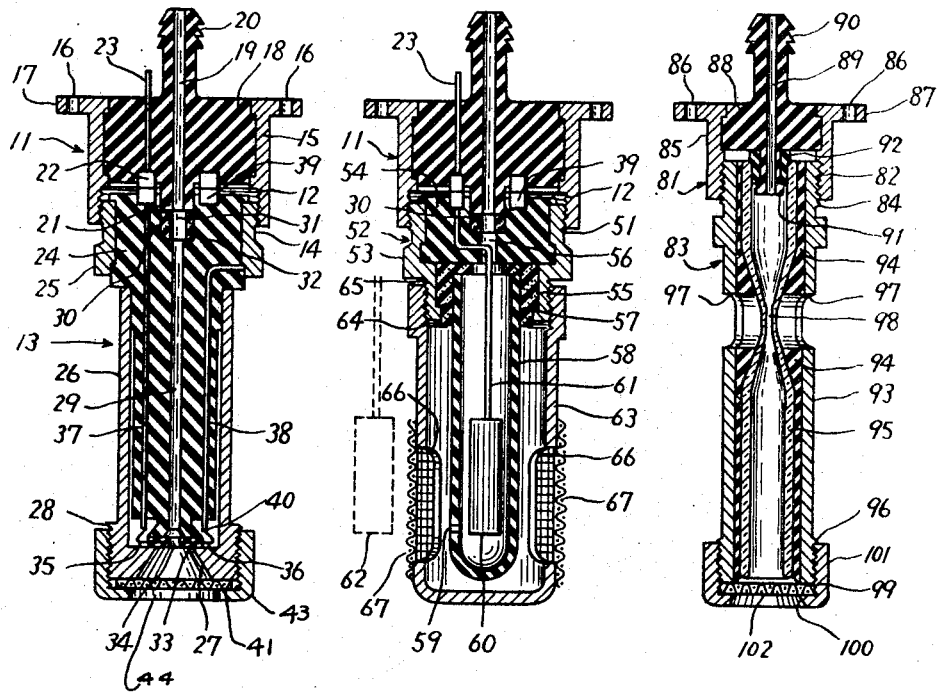

In the drawings:
FIG. 1 is a diagram of one form of apparatus for counting particles suspended in a flowing medium utilizing a particle detector in accordance with the invention;
FIG. 2 is a cross-sectional view of one embodiment of a detector in accordance with the invention which may be utilized with the apparatus illustrated in FIG. 1;
FIG. 3 is a cross-sectional view of a modified embodiment of a detector in accordance with the invention;
FIG. 4 is a diagrammatic illustration of another form of apparatus embodying optical means for counting particles in a flowing medium; and
FIG. 5 is a cross-sectional view of a particle detector in accordance with the invention for use in connection with the apparatus illustrated in FIG. 4.

Referring now to FIG. 1, the numeral 1 is a beaker or other container for a liquid sample 2 such as blood diluted with isotonic sodium chloride solution in a predetermined concentration. A detector 3 in accordance with the invention is immersed in the liquid sample 2, and the sample is forced through the detector 3 by a vacuum source 5 connected through a tube 4 to the detector 3.

The detector 3 which will be described in connection with FIG. 2 embodies capacitive means for detection of the particles and it is connected by means of leads 6 to a capacitive detection circuit 7. A counter 8 is connected with the circuit 7 and records successive pulses of energy produced by the circuit 7 in response to variations in capacitance caused by the particles in the liquid sample 2 moving through the detector 3.

The detector 3 as illustrated in FIG. 2 comprises an upper portion 11 and a lower portion 13 detachably secured to the upper portion 11. More specifically, the portion 11 is provided with a metal cylinder 15 having a peripheral flange 17 at the upper end thereof containing mounting holes 16 for securing it to a suitable support. The lower portion of the cylinder 15 includes internal threads 12 for engagement with cooperating threads on the lower portion 13. The cylinder 15 surrounds a body of insulating material 18 preferably formed of a synthetic resin and provided with a central opening 19 extending therethrough. A tubular connector 20 formed integrally with the body 18 extends from the upper surface thereof for attachment of a tube such as the tube 4 shown in FIG. 1. The lower portion of the body 18 as shown in FIG. 2 includes a cylindrical projection 21 and an electrically conductive ring 22 surrounding the projection 21. The ring 22 is connected with a lead wire 23 extending upwardly through the body 18 for attachment to one of the leads 6 as illustrated in FIG. 1.

The lower portion 13 of the detector includes an elongated body of insulating material 24 having an opening 29 extending therethrough. The upper end of the body of insulating material includes a ring 25 having threads 14 for engagement with the threads 12 on the upper section 11. The lower portion of the body of insulating material 24 is enclosed by an electrostatic shielding cylinder 26 of metal which terminates in an enlarged lower portion having external threads 28. The upper surface of the body of insulating material 24 has an annular recess 30 retaining resilient packing 32. This recess cooperates with the cylindrical projection 21 to seal the upper and lower sections one to the other with the openings 19 and 29 in communication.

The lower end of the electrostatic shield 26 has a conical opening or chamber 27 axially aligned with the opening 29 in the lower portion 13 of the detector. The detecting element 33 is clamped between the bottom end of the insulating body 24 and the inner face of the electrostatic shield 26. The detecting element has a very fine orifice or opening 34 axially aligned with the opening 29 and capacitive electrodes 35 and 36 diametrically positioned on the element 33. A pair of conductors 37 and 38 are embedded in the body of insulating material 24 and have their lower ends connected with the electrodes 35 and 36. The upper end of the conductor 37 is electrically coupled to a ring 39 on the upper face of the insulating material 24 and electrically contacts the ring 22 when the two sections are secured one to the other. The upper end of the conductor 38 is connected to the ring 25 which may be connected directly or through the cylindrical element 15 to the other of the leads 6 as illustrated in FIG. 1. The electrostatic sleeve 26 may be secured in place on the body of insulating material 24 by a suitable resin such as an epoxy resin and a similar resin may be similarly utilized to fill the space 40 between the lower end of the insulating body 24 and the inner surface of the electrostatic shield 26. The lower end of the electrostatic shield 26 is closed by a perforated filter or screen 41 held in place by a cap 43 having a window 44 and screw threads engaging the screw threads 28 on the lower end of the electrostatic shield 26.

The detecting orifice or opening 34 in the detecting element 33 has an opening of the order of 80 microns when utilized for the detection and counting of blood cells. The individual openings in the perforated filter or screen 41 under such conditions would preferably be of the order of 60 to 70 microns. If the opening 34 is made of the order of 50 microns, then the openings in the filter 41 would preferably be of the order of 40 microns.

In operation of the detector described in FIG. 2, it is immersed in the solution 2 as illustrated in FIG. 1 and is coupled by the tube 4 to a suction device 5. In the counting of blood cells, if the blood is diluted 80,000 times, it has been found that the blood cells can be counted within an accuracy of minus 1 percent. The 1 percent accuracy was obtained in practice with the detecting orifice 34 of approximately 80 microns and the openings in the screen 41 of the order of 60 to 70 microns. It has also been found that with the reduction of the detecting opening 34 to 50 microns and the openings in the screen 41 to about 40 microns, it is not possible to detect any error in the blood count under the same conditions of dilution. These accuracies have been obtainable since the screen 41, as the liquid medium is drawn through its openings, functions to break up blood cell clusters and at the same time produce substantial turbulence and agitation within the chamber 27 which is very large in comparison to the opening 34. In this way groups of cells are not only broken up by the screen 41, but cells are substantially uniformly distributed within the chamber 27 so that they will move singly through the opening 34 to provide a precise count.

A modified embodiment of the invention is illustrated in FIG. 3 and functions to detect and count particles such as blood cells and the like by variations in conductivity between electrodes positioned on opposite sides of the detecting orifice. The detector of FIG. 3 as in the case of the previous embodiment of the invention includes upper and lower portions with the upper portion 11 of FIG. 3 being substantially identical to the upper portion 11 of FIG. 2. The lower portion 52 of the detector illustrated in FIG. 3 is threadably coupled to the upper portion 11 by threads 51 carried by an annular metallic structure 53. The annular metallic structure 53 surrounds a body of insulating material 54 such as a synthetic resin and a cup-shaped element 55 of resilient material such as rubber or the like. As in the previous embodiment of the invention, the insulating body 54 has a recess 30 containing an annular resilient seal to seal the two sections of the detector one to the other. An annular ring 39 is carried by the insulating body 54 and contacts the upper ring 22 when the two sections are coupled. The central opening 56 in the insulating body 54 is coupled through the opening in the resilient gasket 31 to the central opening 19 in the upper portion 11.

A cylinder 58 of electrically insulating material is carried in the opening 57 of the resilient member 55. The cylindrical member 58 is preferably formed of glass or other similar material and has a closed bottom portion and a fine detecting orifice or opening 59 in one side wall. The interior of the cylinder 58 carries an electrode 60 supported by a conductor 61 which extends upwardly and through the insulating body 54 and is electrically coupled to the ring 39. The cylindrical member 58 is enclosed by a cap 63 threadably coupled by threads 64 to cooperating threads 65 on the lower end of the annular member 53. The cap 63 is provided with windows 66 which are closed by filters 67, these filters 67 correspond to the filters 41 as described in connection with FIG. 2. A second electrode 62 shown in dotted outline is positioned adjoining the cap 63.

The device illustrated in FIG. 3 would be utilized with apparatus similar to that illustrated in FIG. 1 in that the leads 6 would be connected to the electrodes 60 and 62, and the circuit represented by the block 7 would constitute a circuit responsive to variation in conductivity of the electrodes through the liquid medium 2. The counter 8 would record changes in conductivity since the conductivity in the case of blood cells would increase each time a blood cell passed through the orifice 59.

The orifice 69 in the instant embodiment of the invention is preferably of the order of 40 to 50 microns when utilized for counting blood cells. As in the case of the previous embodiment of the invention, the blood is preferably diluted 80,000 times and under such conditions the accuracy of measurement will be in approximately minus 3 percent and clogging of the orifice 59 is substantially prevented by reason of the action of the filters 67. With prior systems utilizing conductivity variations for counting blood cells, the measuring orifice was of the order of 80 microns and the measuring accuracy was approximately minus 10 percent. Even under such conditions prior known apparatus experienced frequent clogging of the measuring orifice.

While an external electrode 62 has been described in connection with the embodiment of the invention in FIG. 3, it is of course possible to use the cap 63 which is formed of a noncorrosive metal as one of the conductive electrodes and thereby omit the electrode 62.

Still another embodiment of the invention is illustrated in FIGS. 4 and 5. In this embodiment of the invention the blood count is effected by optical means, and the optical detector generally denoted by the numeral 71 includes an upper portion 81 and a lower portion 83. The upper portion 81 comprises an annular metal structure 85 having a body 88 of insulating material retained therein. The annular structure 85 is provided with a flange 87 having openings 86 therein for attachment to a suitable support. The body 88 is provided with a central opening 89, an upwardly extending neck 90 for attachment to a vacuum source 5 by means of a tube 4 as shown in FIG. 4 and a lower projection 91 having an annular resilient packing member 92. The lower portion 83 includes a tubular structure 93 of metal surrounding an inner tubular member 95 preferably of a transparent material such as glass or the like. The tube 95 is secured within the housing 93 by a suitable adhesive material 94 such as an epoxy resin or the like. The metal tube 93 has a threaded section 84 at the upper end thereof which engages threads 82 on the upper member 85 and holds the inner tubular structure 95 in air-tight engagement with the projection 91.

The metal tubular structure 93 has a pair of windows 97 and the construction 98 in the tubular structure 95 is aligned with the windows 97. A cap 101 having a window 100 has threads 99 engaging threads 96 on the tubular member 93. A screen 102 is placed over the window 100 and is held in place between the cap 101 and the bottom end of the tubular metal structure 93. As will be shown, the structure of FIG. 5 affords the same advantages illustrated in FIGS. 2 and 3 in that the screen 102 of FIG. 5 and the constriction 98 of that figure correspond to the screens 41 and 67 of FIGS. 2 and 3 and the orifices 34 and 59 of those figures.

Referring now specifically to FIG. 4, the detector 71 is immersed in the solution 2 and conneced to the vacuum line 4. The windows 97 are aligned with a source of illumination 72 and a lens 73 which focuses the light on the narrow orifice 98. The light emerging from the exit window 97 is again focussed by the lens 74 onto a light sensitive device 75 such as a phototransistor or other conversion element. The signal produced by the light sensitive device 75 is amplified by suitable electronic circuitry 76 which also shapes the signals to produce the desired pulses for opeartion of the counter 8. It is evident of course that in the direction of particles utilizing this system, there must be a difference in the light transmission characteristics of the liquid and the particles being carried by the liquid. Since the filter 102 and the constriction orifice 98 are related in the same manner as those in FIGS. 4 and 5, an exceedingly high degree of accuracy is obtained and at the same time clogging of the orifice 98 is effectively prevented.

While only certain embodiments of the invention have been illustrated and described, it is apparent that alterations, modifications and changes may be made without departing from the true scope and spirit thereof as defined by the appended claims.

What is claimed is:

1. A device for detecting particles suspended in a flowing medium comprising means including a detecting orifice having a diameter permitting single particles to pass freely therethrough, means associated with said orifice for counting said particles as they pass therethrough, a chamber communicating with said orifice and having an entrance opening of an area substantially greater than the area of said orifice, a perforated member closing the opening to said chamber, said member having a multiplicity of perforations with each perforation not exceeding the size of said orifice and means for forcing said medium through said perforated member to break up particle clusters and produce substantial agitation and turbulence in said chamber and thereby cause said particles to move singly through said orifice.

2. A device for detecting particles according to claim 1 wherein said chamber extends outwardly from said orifice and has an area at the point adjoining said orifice smaller than the entrance area.

3. A device for detecting particles according to claim 1 wherein the first said means comprises an elongated body having an opening extending therethrough and terminating at one end in said orifice, and wherein said perforated member is removably secured to said body and overlies the opening in said chamber.

4. A device for detecting particles according to claim 1 wherein said counting means comprises a pair of electrodes associated with said orifice and means connected with said electrodes to detect changes in capacitance therebetween as the particles traverse said orifice.

5. A device for detecting particles according to claim 1 wherein said counting means includes electrodes adjoining the entrance and exit of said orifice and means producing current flow between said electrodes, whereby each of said particles upon moving through said orifice modifies the conductivity of the path between said electrodes.

6. A device for detecting particles according to claim 5 wherein said perforated member constitutes one of said electrodes.

7. A device for detecting particles according to claim 1 wherein the first said means comprises an elongated body having an opening extending therethrough with said detecting orifice communicating with said opening, conductive means surrounding said elongated body and having a window therein, at least the portion of said conductive means including said window being spaced from said body with said perforated member overlying said window, and said particle counting means comprises an electrode within said elongated body and means for passing a current between said electrode and said conductive means.

8. A device for detecting particles according to claim 1 wherein the first said means is formed of a transparent material having said orifice extending therethrough and said particle counting means includes means directing a light beam through said transparent material and light beam.

9. A device for detecting particles according to claim 8 wherein said transparent material is an elongated double open ended tube having a constriction therein forming said orifice and wherein one portion of said tube on one side of said constriction forms said chamber.

10. A device according to claim 9 wherein said double open ended tube is enclosed by a protective housing having a pair of windows aligned with said constricted portion and means on one end thereof for holding said perforated member in overlying relationship with the end of said one portion of said tube.

References Cited

UNITED STATES PATENTS

| | | | |
|---|---|---|---|
| 2,875,666 | 3/1959 | Parker et al. | 250—222 X |
| 3,412,254 | 11/1968 | Meyer-Döering et al. | 356—39 X |
| 3,453,438 | 7/1969 | Ban et al. | 250—218 |

WALTER STOLWEIN, Primary Examiner

U.S. Cl. X.R.

235—92; 250—222